Oct. 11, 1966  F. REBICK  3,277,935
METHOD AND MACHINE FOR MANUFACTURING FLOOR TILES
Original Filed April 19, 1961  4 Sheets-Sheet 1

FIG. 1.

INVENTOR:
FRANK REBICK
per Leon Arthurs
AGENT

Oct. 11, 1966  F. REBICK  3,277,935
METHOD AND MACHINE FOR MANUFACTURING FLOOR TILES
Original Filed April 19, 1961  4 Sheets-Sheet 2

INVENTOR:
FRANK REBICK per: *Leon Arthurs*
AGENT

Oct. 11, 1966     F. REBICK     3,277,935
METHOD AND MACHINE FOR MANUFACTURING FLOOR TILES
Original Filed April 19, 1961     4 Sheets-Sheet 3

INVENTOR:
FRANK REBICK per: Leon Arthurs
AGENT

United States Patent Office 3,277,935
Patented Oct. 11, 1966

3,277,935
METHOD AND MACHINE FOR MANUFACTURING FLOOR TILES
Frank Rebick, 57 Heneker St., Sherbrooke, Quebec, Canada
Continuation of application Ser. No. 104,023, Apr. 19, 1961. This application June 24, 1965, Ser. No. 466,675
13 Claims. (Cl. 144—3)

This application is a continuation of my application Serial No. 104,023, filed April 19, 1961, and now abandoned, for machine for manufacturing flooring tiles.

The invention relates to an improved method and machine for the manufacture of slatted flooring tiles.

The tiles contemplated for manufacture according to the invention consist of a group or complement of wooden slats which are trenched along their undersides and joined together into a composite flooring tile by means of continuous strip keys or wires pressed into such trenches; such tiles being commonly employed in the formation of so called "parquet" floors. Furthermore, under certain circumstances the individual slats forming a composite tile may be separated by relatively thin expansion spaces.

A machine for manufacturing such tiles should preferably be able, at least, to accept said individual slats and sort them, assemble them in the aforesaid relationship, and deliver tiles thus formed in a state in which they are ready or available for use.

Obviously it is desirable in order to obtain the maximum economy in operation that such machine should be capable of functioning continuously and automatically. It is therefore the primary objective of the invention to provide a machine for the manufacture of slatted flooring tiles which is relatively cheap and simple to manufacture and is also relatively economical in operation.

More particularly it is an object of the invention to provide a machine of the aforementioned character in which individual slats are oriented, trenched, keyed together, spaced apart from one another and separated into composite tiles.

It is a further object of the invention to provide a machine of the aforementioned character in which said slats are also levelled to provide a relatively smooth surface on said tiles and are also trimmed to provide relatively regularly shaped tiles of substantially identical dimensions.

More specifically it is an object of the invention to provide a machine of the aforementioned character in which the various operations are performed at a series of stages through which the individual slats are progressed successively.

More specificially, it is an obect of the invention to provide a machine of the aforementioned character in which the progression of the slats is intermittent and synchronized, some said slats moving while others thereof are stationary.

Still more specifically it is an object of the invention to provide a machine having the foregoing advantages in which the progression of said slats is procured and controlled by cyclically operating means forming part of said machine.

In addition to the foregoing, the invention does contemplate further objects which will appear from the hereinafter following description of the elements parts and principles constituting the invention which for convenience is herein treated as being comprised of the two subassemblies A and B.

A preferred form of the invention will now be described by way of example only with reference to the following views and diagrams in which like reference devices refer to like parts of the invention throughout the various views and diagrams, and in which.

Figure 1:
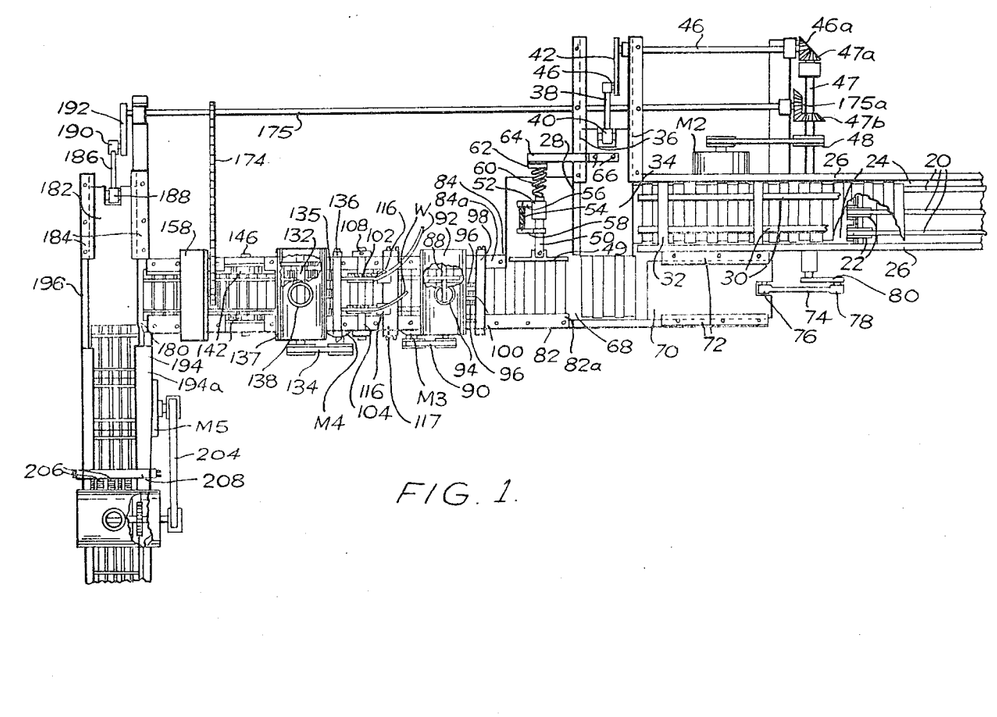
FIG. 1 is a plan view of the instant tile making machine with some portions of part A thereof removed for clarity.
Figure 2:
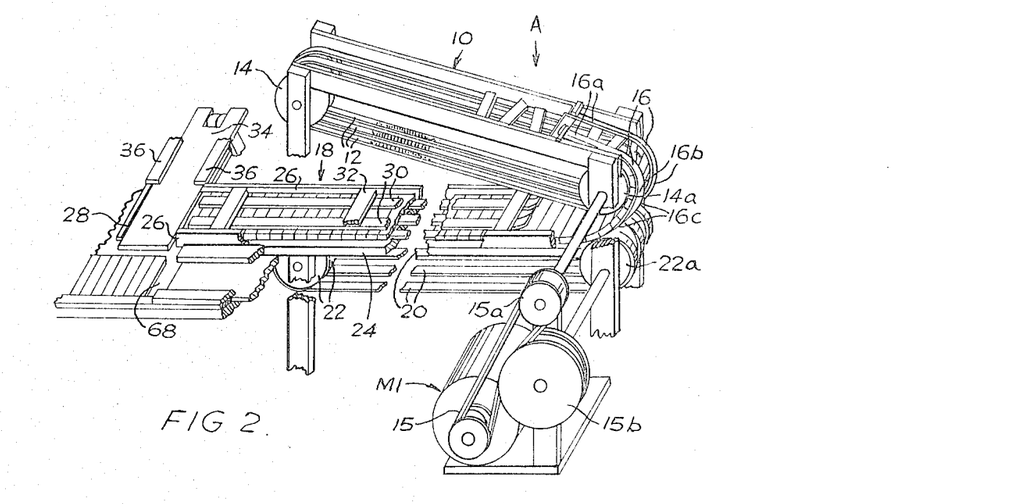
FIG. 2 is an isometric view of part A of the instant tile making machine omitting some details thereof more clearly shown in FIG. 1.

The preferred embodiment of the invention here described for expository purposes may be considered as beeing constituted by two groups of apparatus, namely a sorting and delivering mechanism for preparing a continuous horizontal column of slats and for separating them into groups or complements moving such groups or complements of slats into the second part of the machine, namely, the tile assembly mechanism which provides for trenching said slats, inserting wires therein, trimming said slats in one direction, spacing said slats apart, severing the wires to separate the completed tiles from the remaining horizontal column of united slats and trimming the completed tiles in the other direction. The two parts of the machine are indicated by the letters A and B respectively, part A being best seen in FIG. 2 and part B being seen in FIGS. 12 and 1, which also shows some portions of part A.

Before dealing with the machine in detail, it is noteworthy and will be apparent to those skilled in the art that the present machine may advantageously be incorporated as part of a larger process commencing with the automatic cutting and preparation of the individual slats from larger pieces of timber and ending with the packaging or storing of the completed tiles, such other parts of the complete process being however of no significance in the consideration of the present machine which itself constitutes a single entity, unaffected by such other apparatus.

Furthermore, in describing this preferred embodiment no specific reference is made to the means supporting the whole apparatus, since such means will clearly comprise framework supporting the apparatus at a suitable elevation for operation, parts of which are shown unnumbered in some of the illustrations.

Sorting and delivery mechanism

The function of part A of the machine is to accept randomly placed slats, to form them into a continuous, tightly packed horizontal column, oriented face downwards, and to deliver such slats to the second part of the machine in groups corresponding to the number of slats in a completed tile at predetermined intervals, the foregoing oprations being performed at various stages which will now be described.

Accordingly, the first or sorting stage of part A of the machine consists of carrier 10 (FIG. 2) comprising three moving belts 12 on which slats S (FIG. 12) may be randomly placed by, for example, an operative, or by any suitable mechanical means face upwards, this being in fact the starting point in the tile making process performed by the instant machine. Belts 12 are carried on rollers 14 and 14a driven by motor M1 through belt drive 15 and pulley 15a, so as to carry slats S from their upper to their lower ends towards and into engagement with guide rails 16. Guide rails 16 are spaced some distance from belts 12 at their upper ends 16a, and gradually approach more closely thereto at about their mid points 16b from whence belts 12 will be seen to curve away therefrom as they return beneath roller 14a. Guide rails 16 in fact extend downwardly, their lower ends 16c being supported at an angle and providing a gravity chute for carrying slats S thereon. The second or delivery stage of part A of the machine includes a second carrier 18 comprising belts 20 carried on rollers 22 and 22a the latter being driven by motor M1 through belt drive 15 and pulley 15b, to move slats S from lower ends 16c of guide rails 16 along carrier 18. An elongated table 24 is provided beneath belts 20 for supporting the same and extending for some distance therefrom for receiving slats S as they are propelled off carrier 18 by the motion of belts 20. Walls 26 are provided along either side of table 24 defining a pathway for slats S and maintaining them in a single column. A buffer or stop 28 is provided across the end of table 24 in the path of slats S for restraining further movement thereof. It will be observed that walls 26 stop short of buffer 28 leaving slats S free to slide sideways across table 24 for delivery to the second part of the apparatus in the manner to be described hereinafter. Rails 30 are provided fastened to cross bars 32 for pressing slats S downwardly onto table 24 and retaining them between walls 26.

In order to select the appropriate number or complement of slats S and move them out of the horizontal column, pusher 34 is provided, supported in slides 36 for reciprocation transversely from one side to the other of table 24 between the termination of walls 26 and the face of buffer 28. Pusher 34 is operated by connecting rod 38 (FIG. 1) journalled thereto at 40, the free end thereof being rotatably fastened at journal 44 to crank arm 42 which is itself, fastened to shaft 46 timed and driven by shaft 47, through the medium of bevel gears 46a and 47a respectively, shaft 47 being in turn driven by motor M2 connected thereto by belt drive 48. It should be noted that pusher 34 is a relatively elongated member enabling it to travel a substantial distance out of slides 36 without escaping therefrom and is of a width sufficient to select and push a number or complement of slats S appropriate to one completed tile.

Pusher 34 also operates an auxiliary mechanism for tamping slats S when they are in the second part of the apparatus and aligning them into a regular column. Such tamping mechanism will be seen to consist of the contact bar 49 fastened to push rod 50 slidably carried in collar 52 fastened to table 24. Spring 54 is fastened between brackets 56 on collar 52 and arm 58 on push rod 50 and acts to maintain push rod 50 and contact bar 49 normally retracted away from slats S. A second spring 60 is provided at the free end of push rod 50 carrying a striker plate 62 thereon, oriented to be engaged by striker 64 fastened to pusher 34 by screws 66, when pusher 34 reciprocates forwardly across table 24 for delivery of a group of slats S to the second part of the apparatus.

*Tile assmbly mechanism*

As has been hereinbefore mentioned, this second part of the machine, indicated by the letter B consists of further stages at which the various operations necessary for the assembly of completed tiles are performed, and past which the slats S are progressed intermittently in a continuous horizontal column, and mechanism is provided which is adapted in the first place to receive groups of slats S from the first part of the machine, described above (and indicated by the letter A), and thereafter to push such slats S progressively past the various stages of part B of the machine.

It will be seen that in this second part of the machine the slats S are supported face downwards in a continuous horizontal column or file, by table 68 providing a level, smooth, surface permitting said slats S to slide therealong relatively freely. A pusher 70 is provided at one end of table 68 supported in slides 72 for reciprocation along the axis of table 68, and driven by connecting rod 74 journalled at 76 to pusher 70, the other end thereof being journalled at 78 to crank arm 80 fastened to shaft 47, which, in turn, is driven by motor M2 as aforesaid. For purposes of orientation that end of the table 68 adjacent to the pusher 70 will herein be identified as the rear end and the end thereof remote from the pusher 70 as the front end.

As already mentioned shaft 47 and shaft 46 are interconnected by bevel gears 47a, and 46a, and by this means the reciprocations of the respective pushers 70 and 34 are linked with one another and are synchronized as will appear hereinafter.

Table 68 is provided with a retaining wall 82 extending along the length of one side thereof and a similar shorter wall 84 extending along only part of the other side thereof and leaving a space to enable a group of slats S to be slid from table 24 onto table 68 by pusher 34, table 68 being arranged level with table 24 for the purpose.

Lips 82a and 84a are provided along the tops of respective walls 82 and 84 where necessary, overlapping the edges of slats S and restraining lifting thereof from table 68.

Figure 3:
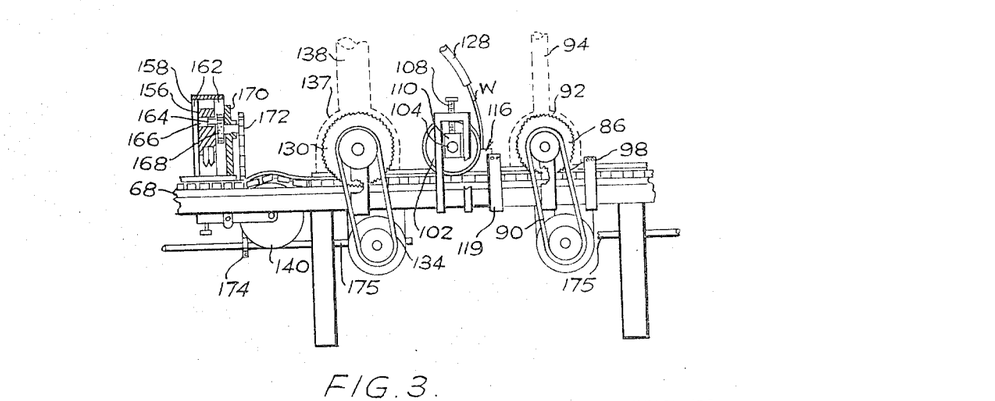
FIG. 3 is a side elevational view of part B of the machine with portions thereof omitted for clarity.
Figure 4:
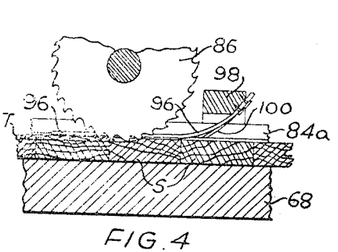
FIG. 4 is an enlarged side elevation of the trench cutting mechanism partly in section.

The first of the stages provided in part B of the machine consists of twin rotary saws 86 (FIG. 3) for cutting parallel trenches T in slats S and they will be seen to be mounted, spaced apart from one another on crossshaft 88 (FIG. 1), supported in any suitable manner and driven by motor M3 connected to shaft 88 by means of belt drive 90. Cowling 92 and air duct 94 are provided enclosing the saws 86 and connected to a suitable air exhausting system for drawing off dust created during operations, in known manner. Spring steel strips 96 of substantial length are fastened to cross bar 98 traversing and attached to table 68 and are biassed to press downwardly on slats S and hold them firmly against table 68 as they pass beneath saws 86. A further strip 100 is provided attached to bar 98 between strips 96 being just long enough to contact slats S at its tip and providing a non-return lock restraining movement of slats S in a reverse direction towards pusher 70, as shown in FIG. 4.

At the next stage of part B of the machine wires are inserted into the trenches T and for this purpose twin guide wheels 102 are provided, freely rotatable on the common shaft 104 which is adjustably supported in brackets 106 by jack screws 108 and bearing plates 110. It will be seen in FIGS. 5–8 that guide wheels 102 are of substantial width and are provided with perimetrical blades 112 having circumferential grooves 114, for engaging wires W guiding and pressing them into trenches T.

Respective guide members 116 carried on cross bar 117, fastened to table 68 by side members 119 are provided in co-operation with wheels 102 for preventing the escape of wires W from grooves 114. A said guide member 116 will be seen to consist of two side plates 118 separated by a flange 120 (FIG. 6) and shims 122 and fastened together by screws 124 by which they are also held in position on brackets 125 fastened to cross bar 117. It will be noted that side plates 118 are extended beyond flange 120 and shims 122 adjacent wheel 102, their confronting surfaces 126 defining an arcuate channel loosely receiving blade 112 of wheel 102 therein and being just wide enough to receive wire W therein, the width thereof being variable by choice of appropriate shims 122.

Furthermore, flange 120 will be seen to extend beyond side plates 118 adjacent slats S and rides in trench T therein to maintain them in alignment with wires W during opeartion. Wires W are fed to wheels 102 through tubes 128 from a suitable source situated some distance from the whole machine.

At the next stage in this part of the machine both ends of slats S are trimmed straight simultaneously, the specific mechanism by which such trimming is achieved comprising twin saws 130 mounted on a cross shaft 132, adjusted a suitable distance apart thereon and driven by a suitable motor M4 connected thereto by belt drive 134, lips 82a and 84a being cut away at this point to permit access of saws 130 thereto. Resilient strips 135 are attached to cross bar 136 fastened to table 68 for holding slats S thereon in the manner described above with regard to strips 96. Cowling 137 is provided extending over saws 130, and exhausted through duct 138 in known manner.

The slat spacing stage is provided by wheels 140 located beneath table 68, which is cut away at its edges, as are lips 82a and 84a, at this point, to permit segments of wheels 140 (FIGS. 3 and 11) to extend above the level of table 68 into the path of slats S thereon. Spring steel strips 142 extend across and bridge the spaces in lips 82a and 84a, one end of each said strip 142 being fastened to its respective lip 82a and 84a by a counter-sunk screw 144, on one side of such space, the other end thereof being free to slide in contact with its respective lip 82a and 84a on the other side of such space.

Wheels 140 are freely rotatable on shaft 146 which is itself carried by arms 148 swingably mounted at fulcrum 150 (FIG. 11) on brackets 152 fastened to table 68. Arms 148 are united at their free ends by cross bar 153 and are adjustably swingable about fulcrum 150 by jack screw 154 threadedly engaging cross bar 153 and bearing against the under surface of table 68.

In order to sever a group of slats S from the continuous horizontal column on table 68, and thus to provide a completed flooring tile F, mechanism is provided for severing wires W at suitable intervals, which consists essentially of chisels 155 (FIGS. 3, 9 and 10) mounted on cross bar, 156 which is in turn slidably carried by frame 158 somewhat in the manner of a guillotine. Side members 160 of frame 158 are fastened to table 68, cross bar 156 carrying chisels 155, sliding in channels 162 therein between raised and lowered positions for severing wires W as aforesaid. Cross bar 156 is timed and operated by crank pin 164 running in slot 166 provided in cross bar 156 for the purpose. Crank pin 164 will be seen to be eccentrically mounted on wheel 168 rotatably mounted in back plate 170 fastened to frame 158 and driven by sprocket 172 and chain 174 connecting the same to shaft 175 driven by motor M2 through the medium of shaft 47 and respective bevel gears 47b and 175a. It is noteworthy that each chisel 155 consists of two blades 176 spaced one behind the other in tandem, both said blades 176 being fastened to cross bar 156 by bolts 178 and being of identical length whereby each wire W is severed in two places simultaneously on each downward movement of cross bar 156.

In order to trim the assembled flooring tiles F in the other direction, along the axis of slats S, a second trimming stage is provided comprising the table 180 set at right angles to and level with table 68 for receiving tiles F therefrom. Tiles F, are progressed along table 180 by means of a pusher 182 supported in slides 184 for reciprocation along the axis of table 180, and being operated by connecting rod 186 one end of which is journalled at 188 to pusher 182, the other end thereof being journalled at 190 to crank arm 192 which is in turn driven by shaft 175 in the manner aforesaid so as to procure reciprocation of pusher 182 in timed relation to the movements of pushers 34 and 70 and chisels 155.

Table 180 is provided with walls 194 and 196 on opposite sides thereof, having respective lips 194a and 196a overlapping the edges of flooring tiles F thereon and holding them down on table 180.

The actual trimming of flooring tiles F is performed by twin rotary saws 198 (FIG. 12) mounted on spaced apart cross shaft 200, driven by any suitable motor M5 through belt drive 204. Flooring tiles F are pressed downwardly onto table 180 as they pass saws 198 by resilient strips 206 fastened to cross bar 208 mounted on table 180.

*Mode of operation*

Assuming that no slats S are present in the machine then operations may be commenced by supplying power to the various motors.

Motors M3, M4 and M5 will then set their respective saws 86, 130, and 198 in motion, and no further reference will be made thereto.

Motor M1 will cause belt drive 15 to drive pulleys 15a and 15b and their respective rollers 14a and 22a in opposite directions thus causing belts 12 to move from rollers 14 and 14a and return therebeneath and at the same time causing belts 20 to move from rollers 22a to roller 20 and return therebeneath.

Motor M2 will cause shaft 47 to rotate, through the agency of belt drive 48, and this will procure corresponding rotation in the reverse direction of shafts 46 and 175, through the agency of gears 46a and 47a and 46b and 175a respectively. Rotation of shaft 47 will also cause rotation of crank arm 80 attached thereto and this, in turn, will procure reciprocation of pusher 70 in slides 72 along the axis of table 68, through the agency of connecting rod 74. Similarly, rotation of shaft 46 will cause rotation of crank arm 42 attached thereto thus, in turn, procuring reciprocation of pusher 34 in slides 36 transversely of the axis of table 24, through the agency of connecting rod 38. Similarly rotation of shaft 175 will procure rotation of crank arm 192 attached thereto thus, in turn, procuring reciprocation of pusher 182 in slides 184 along the axis of table 180, through the agency of connecting rod 186. Rotation of shaft 175 will also drive chain 174 rotating sprocket 172 and wheel 170 attached thereto and thus in turn procuring reciprocation of cross bar 156 and chisels 155 attached thereto, vertically within channels 162 of side members 160, through the agency of crank pin 164 attached to wheel 170 and running in slot 166 formed in cross bar 156 for the purpose.

It should also be noted that reciprocation of pusher 34 as aforesaid on its forward stroke towards table 68 will cause striker 64 attached thereto to engage striker plate 62 on spring 60 and thus move push rod 50 through collar 52 carrying contact bar 49 towards table 68, spring 54 being weaker than spring 60 and yielding to such movement. As pusher 34 makes its return stroke away from table 68 striker 64 will be disengaged from striker plate 62 and spring 54 will simultaneously cause push rod 50 and contact bar 49 to move away from table 68.

All of the movements above described will continue throughout the operation of the machine and will therefore not be referred to in detail. However, one further point is of importance at this juncture namely the synchronization of the various reciprocations of pushers 34, 70 and 182, and also of chisels 155.

Reference may here be made to FIGS. 13a, 13b, 13c, and 13d, showing schematically, various positions of the respective pushers at different stages in a cycle of their reciprocations. Chisels 155 are not indicated in these figures but can be assumed to move in unison with pushers 34 and 182.

Figure 13A:
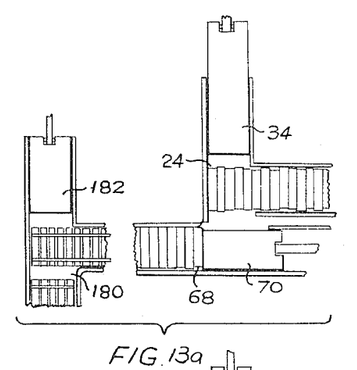
FIGS. 13a, 13b, 13c and 13d are schematic illustrations of the cyclically operating slats pushing mechanism at various points in a cycle of operations thereof.
Figure 13B:
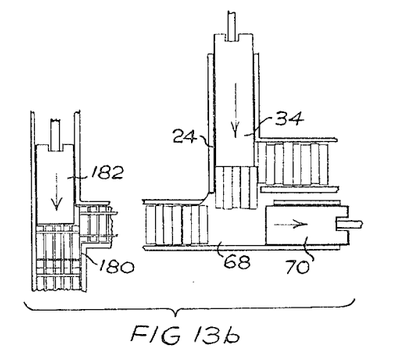
Figure 13C:
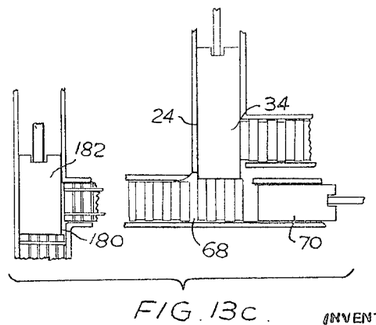
Figure 13D:
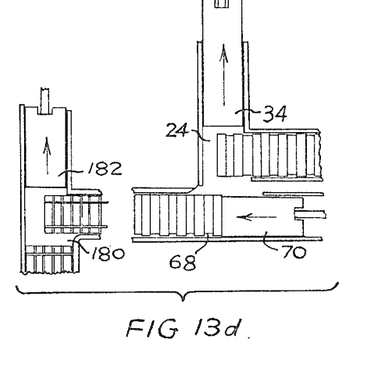

FIG. 13a shows what may be considered as the starting point in the cycle with pusher 70, fully extended in its forward position and pushers 34 and 182 retracted, all three pushers being at rest. FIG. 13b shows pusher 70 partially retracted and pushers 34 and 182 partially advanced; chisels 155, although not shown, will be understood to be moving downwardly on their cutting stroke at this point. FIG. 13c shows pusher 70 fully retracted and pushers 34 and 182 being fully advanced; chisels 155 at this point being at their lowest position. FIG. 13d shows pusher 70 partially advanced and pushers 34 and 182 partially retracted, and moving towards the position shown in FIG. 13a once more, chisels 155 at this point being on their upwards or return stroke.

Individual slats S may be placed on belts 12 at the upper end of carrier 10 face upwards randomly spaced and from thence they will be carried downwardly towards the lower end thereof, passing beneath the upper ends 16a of guide rails 16. As slats S approach the lower end of carrier 10, at rollers 14a, they will be contacted on their upper surfaces by guide rails 16 which will press them firmly against belts 12 forcing them to adopt uniform positions transversely of belts 12. Guide rails 16 will continue to hold slats S firmly until they reach about the midpoints 16b thereof after which belts 12 move away from guide rails 16 leaving slats S to slide thereon under their own weight towards their lower ends 16c in a more or less continuous closely packed horizontal column, face downwards.

From the lower ends 16c of guide rails 16, slats S will be deposited on carrier 18 and will be carried therealong by belts 20 in a continuous horizontal column and propelled onto table 24 at the other end thereof. As further slats S are moved along carrier 18 they will propel those in front of them along table 24, between walls 26 on either side thereof and beneath guide rails 30 towards buffer 28. When the leading slat S reaches buffer 28, the whole horizontal column of slats S following it will be halted, belts 20 slipping therebeneath without otherwise disturbing their positions.

During the foregoing operations the various other parts of the machine are in motion, as described above, but without procuring any result in the absence of any slats passing therethrough. For the purpose of explanation, it is assumed that the arrival of the leading slat S against buffer 28 has occurred while pusher 34 was withdrawn or retracted to one side of table 24 in the position shown in FIG. 13a. As pusher 34 commences its forward reciprocation towards table 68, as aforesaid, it will engage a group of slats S and push them towards table 68 in the manner shown in FIG. 13b. Simultaneously pusher 70 is retracted along slides 72 thereby providing a space for reception of the group of slats S on table 68, being advanced towards the same by pusher 34. When the group of slats S has been advanced squarely into the path of pusher 70, contacting wall 82, pusher 34 will commence its return stroke and simultaneously pusher 70 will commence its forward stroke pushing the group of slats S along table 68. When pusher 34 is again withdrawn to the further side of table 24 belts 20 will advance slats S thereon towards buffer 28 and, when the leading slat S contacts this member belts 20 will continue to slip beneath slats S as described.

It will be understood that the supply of slats S to belts 20 will be replenished simultaneously with such forward movement thereof, slats S on guide rails 16 merely sliding therefrom onto belts 20 and filling up the space thereon.

The forward stroke of pusher 70 will move slats S along table 68 into alignment with contact bar 49, corresponding to the position shown in FIG. 13a, after which pusher 70 will again be retracted as described for the reception of the second group of slats S from pusher 34.

As pusher 34 advances to move such second group of slats S onto table 68 contact bar 49 will be moved in unison therewith as already described and will engage the first group of slats S lying on table 68 and push them firmly into contact with wall 82, aligning them for subsequent movement along table 68 between walls 82 and 84 thereof. It will be appreciated that where slats S are all of precise and uniform dimensions such a tamping operation may not be necessary, but where there are slight discrepancies between such slats S it has been found to be advantageous to include such additional apparatus.

The next forward stroke of pusher 70 will move the second group of slats on table 68 into engagement with the first group causing them in turn, to move further along table 68 into engagement with saws 86, eventually forcing such first group of slats to pass beneath saws 86, while the second group occupies a position aligned with contact bar 49.

It will be understood that this procedure is repeated continuously as a result of each complete cycle of reciprocations of pushers 34 and 70 and slats S will be pushed intermittently along table 68 until they reach table 180. The amount of movement in each such cycle of reciprocations, that is imparted to any one group of slats S corresponds to the length of the particular group of slats S adjacent pusher 70. It will be appreciated, that such length may be variable, within relatively close limits, due to discrepancies between slats S, introducing slight differences in the amount of movement in any one cycle of reciprocations but this is allowed for in the manner described below.

Figure 12:
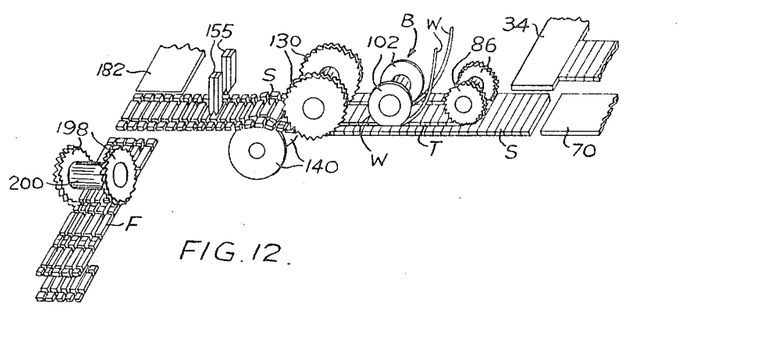
FIG. 12 is a schematic, isometric view of part B of the instant tile making machine.

Reference may now be made to the schematic view of FIG. 12 showing the various stages of Part B of the machine past which slats S are progressed intermittently in this manner, the contact bar 49 and associated mechanism being omitted from this view for clarity.

As already stated the first stage is provided by saws 86 which cut trenches T in slats S as they are pushed therebeneath, lips 82a and 84a and strips 96 holding slats S firmly down on table 68 during this operation ensuring a trench T of uniform depth. Strip 100 restrains rearward movement of slats S towards pusher 70 when this member is on its return stroke as aforesaid.

It will be appreciated that slats S lie face downward on table 68, trenches T being cut in what will become the reverse or underside of the completed flooring tiles F. In this manner the faces of slats S are maintained level with one another, any variations in slat thickness appearing on the underside of flooring tiles F. Furthermore, this mode of operation results in trenches T leaving a uniform thickness of slat material available for wear or sanding and the like.

As slats S emerge from the first trenching stage, and move into the second, wiring stage, they pass beneath guide members 116 carried on cross bar 117, flanges 120 thereof riding in trenches T. Slats S then pass beneath wheels 102 which are engaged and rotated, on shaft 104, by slats S, blades 112 running in trenches T.

It will be remembered that wires W are carried by guide members 116 between surfaces 126 of plates 118 and are held thereby in grooves 114 formed in blades 112 of wheels 102.

Figures 5, 8, 9, 10, 11:
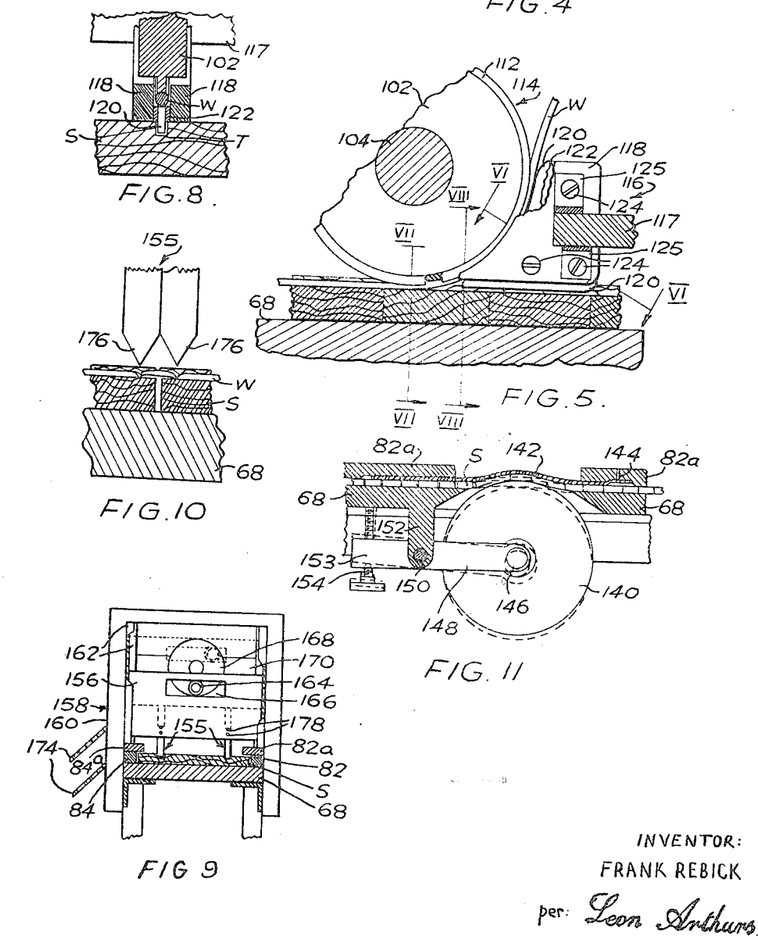
FIG. 5 is an enlarged side elevation of the wire inserting mechanism partly in section.
FIG. 8 is a section of part of the mechansm shown in FIG. 5 along the line VIII—VIII thereof.
FIG. 9 is an end elevation of the wire cutting mechanism.
FIG. 10 is enlarged sectional side elevation of part of the mechanism shown in FIG. 9.
FIG. 11 is a side elevation of the slat spacing mechanism partly in section.
Figure 6:
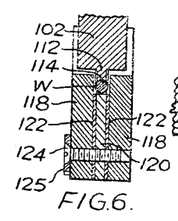
FIG. 6 is a section of part of the mechanism shown in FIG. 5 along the line VI—VI thereof.
Figure 7:
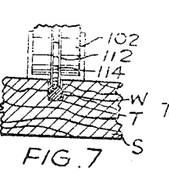
FIG. 7 is a section of part of the mechanism shown in FIG. 5 along the line VII—VII thereof.

The forward movement of slats S will thus cause wires W to be drawn through guide members 116 and around blades 112 which will then press progressively down into trenches T. This operation may be studied in FIG. 5 and in the sectional views of FIGS. 6, 7 and 8 showing progressively the movement of wires W from guide members 116 to trenches T.

The precise depth of blades 112 in trenches T can be adjusted by means of jack screws 108 drawing plates 110 upwardly or downwardly in brackets 106 thus raising or lowering wheels 102 and shaft 104 attached thereto.

Similarly guide members 116 can be adjusted to accept wires W of varying sizes by disassembling said members 116, by screws 124 and substituting alternative shims 122 and flange 120 as desired.

Slats S, united into a continuous horizontal column by wires W are now moved into engagement with saws 130 spaced apart to trim the ends of slats S and cut them to a uniform length, slats S being held firmly down on table 68 by strips 135 during this operation.

Beyond saws 130 slats S are moved over wheels 140, segments of which project through gaps cut in table 68 for the purpose as already described, strips 142 holding slats S down against wheels 140 and forcing them to follow a curved path, to some extent, though not conforming precisely to the profile of wheels 140. It will be seen that by moving slats S around wheels 140 in this manner they are levered apart to a limited extent along wires W and when they return again to table 68 they will be seen to be separated by relatively thin spaces. The degree of such spacing can be increased by moving wheels 140 up by means of screwing jack screw 154 through cross bar 153 towards table 68, thus causing arms 148 to swing about fulcrum 150 and forcing wheels 140 on shaft 148 upwardly. Strips 142 are adapted to yield to such adjustment by arching upwardly to a greater degree, only one end of strips 142 being fixed, by screws 144, the other ends thereof being free to slide between lips 82a and 84a and slats S.

Slats S now pass beneath chisels 155 carried on cross bar 156 and it will be remembered that this member is reciprocated up and down, moving and dwelling in unison with pushers 34 and 182. Accordingly, it will be appreciated that while slats S are moving forwardly along table 68, under the influence of pusher 70 chisels 155 will first move upwardly on a return stroke and thereafter dwell momentarily. As pusher 70 reaches the limit of its forward stroke chisels 155 will commence their downward stroke, at which point slats S will be at rest, on table 68. Slats S will remain stationary while chisels 155 complete their downward stroke, blades 176 severing each wire W in two places. Chisels 155 will then rise again and slats S will commence to move once more under the influence of pusher 70 in the manner aforesaid.

Clearly it is of importance that the severing of wires W should be achieved between two slats S so as to free the leading group of slats S from the remainder. Accordingly it will be noted that the precise location of chisels 155 along table 68 is critical in achieving this result and they should be so placed as to ensure that blades 176 thereof straddle the space between two slats S, when slats S are stationary on table 68, in the manner shown in FIG. 10.

This mode of operation also ensures that no loose ends of wires W will project beyond slats S in the completed tiles F and furthermore, leaves the edge portion of slats S available for trimming the completed tiles F to size.

The group of slats S so freed from the remainder of the slats S on table 68 is now referred to as a flooring tile F, and as pusher 70 makes its next forward stroke tile F will be pushed off table 68 onto table 180, into contact with wall 196 thereof. It will be noted from FIGS. 13d and 13a that pusher 182 is at this point retracted, leaving table 180 vacant for reception of the tile F, but when pusher 182 makes its next forward stroke it will push tile F along table 180, between walls 194 and 196 thereof, towards saws 198. Tile F will come to rest at the end of the forward stroke of pusher 182 which is then retracted for reception of a second tile F from table 68 in the manner aforesaid, progress of tile F along table 180 thus being intermittent, in the same manner as that of slats S along table 68 already described.

While tile F passes between saws 198 any surplus slat material will be cut from the two outer slats S on either side of the tile F rendering tile F of a uniform and precise size, tile F being held firmly down against table 180 by strips 206.

When operating with wood which produces inferior slats S some tiles F leaving table 68 may be faulty in some way rendering it unecessary or undesirable to pass them between saws 198.

Accordingly table 180 may be extended, between pusher 182 and saws 198, providing an inspection site for checking tiles F, the nature of such extension being self-explanatory and hence not shown in the illustrations.

Similarly, table 180 may be continued beyond saws 198 to communicate with, for example, packaging machinery, or merely to provide a delivery site for tiles F, such further details being omitted from the illustrations for clarity.

While the particular embodiment of the invention shown and described above does not reflect all of the changes and modifications of which it is susceptible and which may occur to those in the art, it is expressly observed that such omission should not be construed as a waiver of any rights therein to which I may be fairly entitled within the scope of the claims now following:

What I claim is:

1. Machinery for forming slatted tiles comprising:
   a table for slats arranged in a continuous unbroken column;
   a pusher at one end of said table;
   means for delivering successive groups of slats to said pusher, said pusher being operable in timed relation to said slat delivery means to advance said groups to be added to the rear of said column and to advance the column as a unit towards the other end of said table, permitting the slats to be retained under compression and in alignment in said column while being processed, and
   mechanisms disposed at spaced stations along said column for successively forming trenches in successive slats, for depositing continuous key in said trenches binding said slats together in a united column, for trimming said slats and for severing said key to detach from said united column successive tiles comprising united groups of slats;
   said trimming mechanism being interposed between the mechanisms for depositing key in said trenches and for severing said key;
   said mechanisms permitting processing of said slats while they are arranged in said continuous unbroken column which is subsequently divisible into individual tiles.

2. Machinery for forming slatted tiles comprising:
   a table for supporting slats arranged in edge-to-edge abutting relationship in a continuous unbroken column;
   a pusher disposed at one end of said table;
   means for delivering successive groups of slats to said pusher;
   said pusher being operable in timed relation to said slat delivering means to advance said groups to be added to the rear of said column and to advance the column as a unit on said table towards the other end thereof permitting the slats to be maintained under compression and in alignment in said column while being processed;
   mechanisms disposed at spaced stations along said column for operating upon said slats while arranged in said edge-to-edge abutting relationship in said unbroken column and for binding said slats together and for cutting tiles therefrom;
   trench forming mechanism, constituting one of said mechanisms, for successively forming trenches in successive slats while they are disposed in said edge-to-edge abutting relationship;
   wire depositing mechanism, constituting another of said mechanisms, for inserting in said trenches while said slats are in said abutting relationship a continuous length of wire drawn from a continuous supply and for simultaneously imbedding said wire frictionally in said trenches binding said slats together in a united column and frictionally holding them together in said edge-to-edge abutting relationship restricting movement of the slats relative to each other as they pass in said columnar order towards the mechanisms aforesaid;

said continuous length of wire being advanced from said supply at a rate equal to the rate of advance of said column upon said table;

severing mechanism, constituting another of said mechanisms, for severing said wire to detach tiles respectively, comprising united groups of slats from said united column, and spacing mechanism, disposed between said wire depositing mechanism and the said severing mechanism, constituting a still further said mechanism, for spacing said slats slightly from each other while they are frictionally retained in said continuous column by said continuous length of wire.

3. Method of forming slatted tiles comprising the steps:

of arranging slats in aligned edge-to-edge abutting relationship in a continuous unbroken column;

of moving said continuous column of slats through processing stages by the application of a pusher to the rear of said column;

of forming trenches successively in successive slats in said column at one end of said stages while said slats are disposed in said edge-to-edge abutting relationship;

of inserting in said trenches while said slats are in said abutting relationship a continuous length of wire drawn from a continuous supply and of simultaneously imbedding said wire frictionally in said trenches binding said slats together in a united column and frictionally holding them in said edge-to-edge abutting relationship restricting movement of the slats relative to each other, said inserting and imbedding being effected at another of said stages;

said continuous length of wire being advanced from said supply at a rate equal to the rate of movement of said continuous column;

of severing said wire at intervals at another of said stages to detach tiles respectively comprising united groups of slats from said united column and of adding successive groups of slats to the rear of said column at intervals corresponding to said key severing intervals, and of spacing said slats slightly from each other whilst said slats are frictionally retained in said continuous column by said continuous length of wire and before said wire is severed.

4. Machinery for uniting groups of equi-dimensional slats into slatted tiles comprising:

a table for supporting said slats arranged in edge-to-edge abutting relationship and upon which said slats are advanceable in a continuous unbroken column from the rear end to the front end of the table;

mechanisms disposed at spaced stations along said column for operating upon said slats while arranged in said edge-to-edge abutting relationship in said unbroken column for binding said slats together and for successively cutting uniform groups of such bound together slats from said column;

trench forming mechanism, constituting one of said mechanisms, for forming trenches in successive slats while they are disposed in said edge-to-edge abutting relationship and as they are advanced along the table in continuous and unbroken columnar order.

wire depositing mechanism, constituting another of said mechanisms, for inserting into said trenches, while said slats are in said abutting relationship, a continuous length of wire drawn from a continuous supply and for simultaneously imbedding said wire frictionally in said trenches binding said slats together in a united column and frictionally holding them in said edge-to-edge abutting relationship restricting movement of the slats relative to each other as they pass in said columnar order towards the other of the mechanisms aforesaid;

said continuous length of wire being advanced from said supply at a rate equal to the rate of advance of said column on said table;

severing mechanism, constituting another of said mechanisms, for severing said wire to detach tiles respectively comprising united groups of slats from said united column;

a pusher disposed for reciprocating movement between advanced and retracted positions at the rear end of said table;

means for delivering successive groups of slats to said pusher, each of said successive groups comprising the same number of slats as a said tile;

said pusher being operable to engage each group of slats delivered thereto as aforesaid, to advance said group of slats on said table for addition to the rear of said column and to advance the column as a unit on said table past said mechanisms through successive steps each corresponding in length to the length of a said group of slats, and means synchroniziing the operations of said pusher and said slat delivering means to procure delivery of a group of slats to said pusher by said slat delivering means when said pusher is in its retracted position and subsequent movement of said pusher from its retracted to its advanced position engaging and advancing said group of slats as aforesaid and advancing the column as a unit through one step past said mechanisms.

5. Machinery as claimed in claim 4 wherein:

said slat delivering means includes a second pusher mounted adjacent said first mentioned pusher for reciprocating movement between advanced and retracted positions;

said second pusher being operable, as it moves towards its advanced position, to engage a said group of slats and push it into the path of said first mentioned pusher and being controlled by said synchronizing means to move towards advanced position as aforesaid while said first mentioned pusher moves towards its retracted position.

6. Machinery as claimed in claim 4 wherein:

said slat delivering means includes a second pusher mounted adjacent said first mentioned pusher for reciprocating movement between advanced and retracted positions;

said second pusher being operable, as it moves towards its advanced position, to engage a said group of slats and push it into the path of said first mentioned pusher, and a third pusher is mounted for reciprocating movement between advanced and retracted positions at the front end of said table;

said third pusher being operable, as it moves towards its advanced position, to engage a said detached tile and progress it towards a delivery site in a direction at right angles to the direction of movement of said column;

said synchronizing means being arranged to procure, substantially simultaneously, movement of said second and third pushers towards their advanced positions and movement of said first mentioned pusher towards its retracted position.

7. Machinery as claimed in claim 6 wherein:

a single motor is provided for driving said pushers, and said synchronizing means includes series of mechanical elements transmitting motion to said pushers from said motor.

8. Machinery as claimed in claim 4 including:

spacing mechanism disposed between said wire depositing mechanism and said severing mechanism;

said spacing mechanism including means for levering said slats apart for spacing them slightly from each other whilst they are frictionally retained in said continuous column by said continuous length of wire.

9. Method of forming slatted tiles comprising the steps:
of arranging slats in aligned edge-to-edge abutting relationship in a contiinuous, unbroken column;
of movng said continuous column of slats through processing stages by the application of a pusher to the rear of said column;
of forming trenches successively in successive slats in said column at one of said stages while said slats are disposed in said edge-to-edge abutting relationship;
of advancing a continuous length of wire from a supply at a rate equal to the rate of movement of said continuous column, and, while said slats are in their said abutting relationship, simultaneously inserting and imbedding said wire in said trenches binding said slats together while still in their columnar order and frictionally holding them in said edge-to-edge abutting relationship restricting movement of the slats relative to each other, said inserting and imbedding being effected at another of said stages, and
of severing said wire at intervals at another of said stages to detach tiles respectively comprising united groups of slats from said column, said severing being effected between confronting edges of a pair of adjacent tiles bound together by said wire.

10. Machinery as set forth in claim 4 including:
slat trimming mechanism for trimming the ends of said slats and cutting them to a uniform length while frictionally held in said united column by said continuous wire;
said slat trimming mechanism being interposed between said wire depositing mechanism and said severing mechanism.

11. Machinery as set forth in claim 4 wherein:
said mechanisms are disposed over said column of slats.

12. Method of forming slatted tiles as claimed in claim 9 comprising the further step:
of adding successive groups of slats to the rear of said column at intervals corresponding to said wire severing intervals.

13. Method of forming slatted tiles as claimed in claim 9 wherein:
said slats are arranged on said table in aligned edge-to-edge relationship in a continuous column in face down position with their undersurfaces uppermost, and
said trenches are formed in the undersurfaces of successive slats in said column.

References Cited by the Examiner

UNITED STATES PATENTS

| | | |
|---|---|---|
| 2,650,627 | 9/1953 | Tibbals. |
| 2,713,380 | 7/1955 | Baumann. |
| 2,961,021 | 11/1960 | Tibbals _______________ 144—3 |

WILLIAM W. DYER, Jr., *Primary Examiner.*

W. D. BRAY, *Assistant Examiner.*